United States Patent
Miwa et al.

[11] Patent Number: 6,112,872
[45] Date of Patent: Sep. 5, 2000

[54] ELECTROMAGNETIC CLUTCH

[75] Inventors: Tadashi Miwa; Toru Makino; Naoki Watanabe; Sadatoshi Inoue, all of Hachioji, Japan

[73] Assignee: Konica Corporation, Tokyo, Japan

[21] Appl. No.: 09/211,128

[22] Filed: Dec. 14, 1998

[30] Foreign Application Priority Data

| Dec. 18, 1997 | [JP] | Japan | 9-370514 |
| Dec. 18, 1997 | [JP] | Japan | 9-370515 |
| Dec. 26, 1997 | [JP] | Japan | 9-366924 |

[51] Int. Cl.[7] .................................................. G03B 27/00
[52] U.S. Cl. ................. 192/55.3; 192/30 V; 192/84.961; 192/107 C; 192/209
[58] Field of Search .................. 192/55.2, 55.3, 192/30 V, 84.961, 209, 107 C, 200; 464/87, 92

[56] References Cited

U.S. PATENT DOCUMENTS

| 4,300,832 | 11/1981 | Hudson . |
| 4,589,760 | 5/1986 | Iimori . |
| 4,799,662 | 1/1989 | Sagara et al. . |

FOREIGN PATENT DOCUMENTS

| 0 065 923 | 12/1982 | European Pat. Off. . |
| 0 154 230 | 9/1985 | European Pat. Off. . |
| 0 239 401 | 9/1987 | European Pat. Off. . |
| 0 339 431 | 11/1989 | European Pat. Off. . |
| 0 350 789 | 1/1990 | European Pat. Off. . |
| 0 614 022 | 9/1994 | European Pat. Off. . |
| 0 702 167 | 3/1996 | European Pat. Off. . |
| 2 533 282 | 3/1984 | France . |
| 33 35 181 | 3/1984 | Germany . |
| 40 19 493 | 1/1991 | Germany . |

*Primary Examiner*—Rodney H. Bonck
*Assistant Examiner*—Sául J. Rodriguez
*Attorney, Agent, or Firm*—Frishauf, Holtz, Goodman, Langer & Chick, P.C.

[57] ABSTRACT

A clutch is provided with an input section for inputting driving force in to the clutch, an output section for outputting driving force from the clutch, a shifting device for shifting one of the input section and the output section against the other one between an engaging position where the driving force is transmitted by the engagement of the input section with the output section and a releasing position where the driving force is intercepted by releasing the one from the other; and a shock easing member provided to at least one of the input section and the output section, for ease shock caused by the shifting.

16 Claims, 13 Drawing Sheets

| TEST SAMPLE | SPECIFICATION (may be abbreviated as SPEC.) | MAXIMUM | AVERAGE | MINIMUM |
|---|---|---|---|---|
| INITIAL | NO VISCOELASTIC MEMBER | 75.1 | 73.7 | 73.1 |
| No. 1 | EPTOSEALER | 73.1 | 71.3 | 70.2 |
| No. 2 | E-4070 | 72.0 | 70.8 | 70.1 |
| No. 3 | POLYURETHANE ELASTOMER | 71.7 | 70.6 | 70.1 |

ELECTROMAGNETIC CLUTCH

BACKGROUND OF THE INVENTION

This invention relates to a clutch used, for example, in an image forming apparatus such as a copying machine, and in particular, to an electromagnetic clutch.

In recent years, the tendency to give a sufficient consideration to environment is promoted worldwide. Such tendency extends to so called OA equipment used in a office, and it is required that the OA equipment be energy-saving, reduce-exhaust such as dust and operate ozone, and quietly Regarding one of the above-mentioned requirements, making the OA equipment quiet, it is possible to cope with it by providing a sound-insulating wall around the whole OA equipment. However, it is not desirable to provide such sound insulating wall because it increase both the manufacturing cost and the weight of the machines.

In order to make the operation of the OA equipment quiet without using the sound-insulating wall it becomes necessary to eliminate the cause of the noises thoroughly.

Incidentally, in an image forming apparatus such as a copying machine and a printer, which are a part of the OA equipment, a driving force transmitting system including a gear train and a timing belt mechanism is employed for transmitting a driving force, for example, to paper feeding rollers at a predetermined timing.

Such a driving force transmitting system is disposed in a manner to link a motor and the paper feeding rollers, and at the time of transmitting the driving force of the motor to the paper feeding rollers, the timing for paper feeding is determined by using an electromagnetic clutch disposed in the above-mentioned driving force transmitting system.

Now, the electromagnetic clutch according to the conventional technology will be explained. FIGS. 18 and 19 are partial cross-sectional views in the direction of the axial line of the electromagnetic clutch 910 according to the conventional technology; in FIG. 18, the electromagnetic clutch 910 is in the state of being off the driving force, and in FIG. 19 it is in the state of driving force transmitting.

In the state shown in FIG. 18, because an electric current does not flow in the coil 912, the armature 917 made of a magnetic material is retracted to the side of the gear 919 by the resilient force of the plate-shaped spring member 918. Owing to this, the rotor 915 and the armature 917 are kept in a completely separated state so that they may be prevented from rotating together to intercept the driving force transmission.

On the other hand, in the state shown in FIG. 19, because an electric current flows in the coil 912, the armature 917 is attracted to the rotor 915 by the generated electromagnetic force. Owing to this, the rotor 915 and the armature 917 are kept in a completely engaged state with each other to enable the driving force transmission.

As is clearly understood by FIG. 19, when the electromagnetic clutch 910 is switched to the transmitting state of driving force from the off state of driving force, the armature 917 is displaced for a distance D; at this time the armature 917 is accelerated to collide with the rotor 915, then the armature and the rotor vibrate to generate a comparatively large shock noise.

Further, when the electromagnetic clutch 910 is switched to the off state of driving force from the transmitting state of driving force, the armature 917 is retracted for the same distance D to collide with the spring member 918, or with the gear 919 through the spring member, thereby the armature 917, the rotor 915, and the gear 919 vibrate to generate a comparatively large shock noise in the same manner as the above.

As a countermeasure to reduce or eliminate the above-mentioned shock noise, it is considered to suppress the acceleration of the armature 917 to displace in the axial direction by making a control to rise the attracting force of the electromagnetic clutch 910 slowly. However, by such a countermeasure, in addition to the increase of the manufacturing cost due to the addition of the control circuit, the electromagnetic clutch is forced to be in the so called 'half clutching' state, possibly to bring about the early abrasion of the electromagnetic clutch.

Incidentally, among the gears, timing belt pulleys, and so forth in the medium of driving force transmission, there are provided clearances to some extent. On the other hand, when the electromagnetic clutch is in the off state of driving force, the portion from the motor to the coupling portion to the driving source in the electromagnetic clutch rotates with a light load, but the paper feeding rollers are in contact with the paper sheet whereon an image is to be recorded and are in the state of being loaded.

When the electromagnetic clutch is brought into the transmitting state of driving force from the above-mentioned state, the coupling portion to the driving source and the coupling portion to the driven member are coupled in a moment to generate a shock noise. In the case where a gear train and so forth are provided in the downstream side of the electromagnetic clutch, such a shock noise is thought to be generated, due to the cause that the gears and the timing belt pulley in the upstream side run freely for the clearance and collide with the gears and toothed surface of the belt in the state of being loaded, at the moment when the electromagnetic clutch is brought into the transmitting state of driving force.

Further, in the case where a gear train and so forth are provided in the upstream side of the electromagnetic clutch, such a noise is thought to be generated due to the following cause. When the electromagnetic clutch is in the off state of driving force, the gears in the gear train are rotating by the driving force of the motor, but only a comparatively low rotating torque (several kg-cm) is transmitted because no load is given to it. In this state, when the electromagnetic clutch is brought into the transmitting state of driving force, a heavy load is suddenly given to the gear train and so forth; hence, a strong and unstable force is generated momentarily to act on the every tooth surface of the gears and the nip surface of the paper feeding rollers, and further, on the bearings inserted in the gears, the bearings of the rotating shaft of the gears, and so forth, causing the behavior of the every member to be put in disorder to generate a shock noise. In addition, in copying machines and printers of electrophotographic type, the torque of the paper feeding rollers is in the range from 5 kg-cm to 20 kg-cm. From the above-mentioned point of view to make the operation of OA equipment quiet, it is favorable to reduce or eliminate such a noise.

As a countermeasure for reducing or eliminating the above-mentioned shock noise, it is thinkable that the attracting force of the electromagnetic clutch is controlled to rise up slowly to rotate the driven portion gradually. However, by such a countermeasure, in addition to the increase of manufacturing cost due to the addition of the control circuit, the electromagnetic clutch is forced to be in the so-called 'half-clutching' state for a long time, possibly to bring about the early abrasion in the facing of the electromagnetic clutch.

SUMMARY OF THE INVENTION

It is an object of this invention to provide a clutch and an image forming apparatus with a reduced shock noise, and a structure for reducing a noise.

For accomplishing the above-mentioned object, the clutch according to this invention is composed of:

an input portion for inputting driving force, an output portion for outputting driving force, a displacing means for displacing one of said input portion and said output portion against the other between the engaging position where driving force transmission is done by the engagement of said input portion with said output portion and the releasing position where driving force is intercepted by releasing the one from the other, and a shock easing member disposed in both or one of said input portion and said output portion, and said shock easing member eases the shocking force generated when said one is displaced against said the other by said displacing means.

By the clutch of this invention, when the aforesaid displacing means displaces the one of the aforesaid input portion and the aforesaid output portion against the other, the vibration in the aforesaid input portion or in the aforesaid output portion is effectively damped by the shock easing member disposed in both or one of the aforesaid input portion and the aforesaid output portion; hence, the shock noise can be reduced by it.

Further, for accomplishing the aforesaid object, the clutch according to this invention is composed of a driving source coupling portion coupled to a driving source for transmitting driving force, a noise reducing means coupled to a driven member to which driving force is transmitted, a driven member coupling portion coupled to said noise reducing means, and a displacing member for displacing at least one of both coupling portions against the other for said driving source coupling portion and said driven member coupling portion to engage with or to be released from each other; further, said noise reducing means is composed of a protruding portion disposed at one of said driving source and said driving source coupling portion, and an elastic member disposed at the other so that driving force may be transmitted between said elastic member and said protruding portion when said driving source coupling portion and said driven member coupling portion engage with each other, and said elastic member eases the shock force transmitted from said protruding portion.

Further, the noise reducing structure according to this invention is a noise reducing structure coupling a driving source for transmitting driving force and a driven member to which driving force is transmitted in a manner such that the transmission of driving source is enabled, and comprises a protruding portion disposed at one of said driving source and said driven member and an elastic member disposed at the other of said driving source and said driven member so that driving force may be transmitted between said elastic member and said protruding member; and said elastic member eases the shock force transmitted from said protruding portion.

According to the clutch of this invention, the aforesaid noise reducing means is composed of a protruding portion disposed at one of the aforesaid driving source and the aforesaid driving source coupling portion, and an elastic member disposed at the other so that driving force may be transmitted between said elastic member and said protruding portion when said driving source coupling portion and the aforesaid driven member coupling portion engage with each other, and said elastic member eases the shock force transmitted from said protruding portion; hence, for example, when the clutch is brought into the transmitting state of driving force, said protruding portion collides with said elastic member and the shock force given by the colliding is eased, thereafter the driving force is gradually transmitted, whereby the shock noise is to be eased.

According to the noise reducing structure of this invention, the structure is composed of a protruding portion disposed at one of the aforesaid driving source and the aforesaid driven member, and an elastic member disposed at the other of said driving source and said driven member so that driving force may be transmitted between said elastic member and said protruding member, and said elastic member eases the shock force transmitted from said protruding portion; hence, in the transmitting medium for driving force provided with this noise reducing structure, even if a sudden rise of load or the like occurs, said protruding portion collides with said elastic member and the shock force given by the colliding is eased, thereafter the driving force is gradually transmitted, whereby the shock noise is to be eased.

BRIEF DESCRIPTION OF THE DRAWINGS

FIG. 2 is a perspective view showing the paper feeding-transporting unit 5 housed inside the upper paper feeding-transporting door 4a;

DETAILED DESCRIPTION OF THE PREFERRED EMBODIMENT

In the following, the first embodiment according to this invention will be explained with reference to the drawings.

Figure 1:
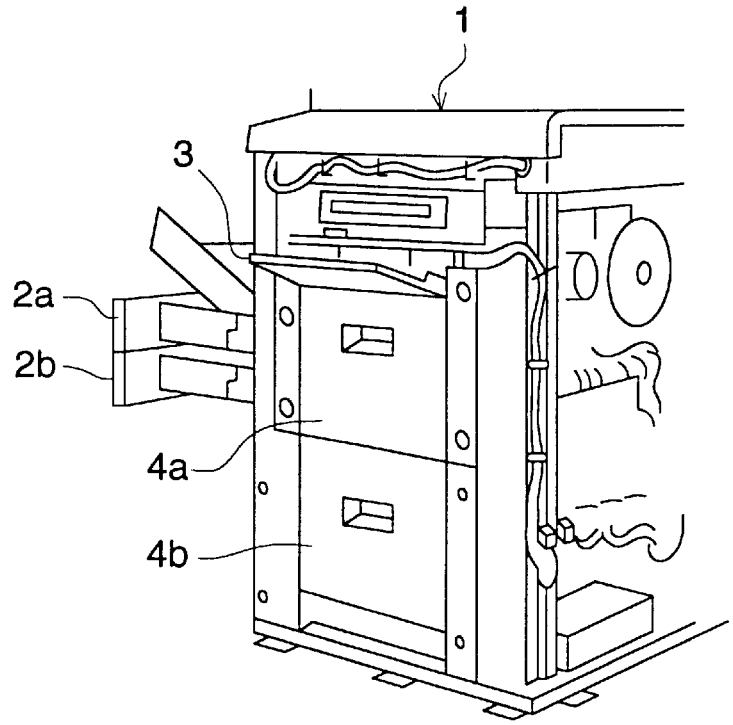
FIG. 1 is a perspective view of the right side of the copying machine 1, an image forming apparatus, seen from the obliquely rear direction.

FIG. 1 is a perspective view of the right side of the copying machine 1, an image forming apparatus, seen from the obliquely rear direction. In FIG. 1, at the front side (left side in the drawing) of the copying machine 1, the trays for stocking paper sheets 2a and 2b are shown in the state of being drawn out. At the right side of the copying machine 1, the manual feeding plate 3 is provided in the upper portion, and under that, the upper paper feeding-transporting door 4a and the lower paper feeding-transporting door 4b are disposed.

Inside the upper paper feeding-transporting door 4a and the lower paper feeding-transporting door 4b the paper feeding-transporting units are disposed respectively. The paper feeding-transporting units are adjacent to the trays 2a and 2b respectively inside the copying machine 1, and have the function to feed and transport the paper sheets in the trays. An example of such paper feeding-transporting units is shown in FIG. 2.

Figure 2:
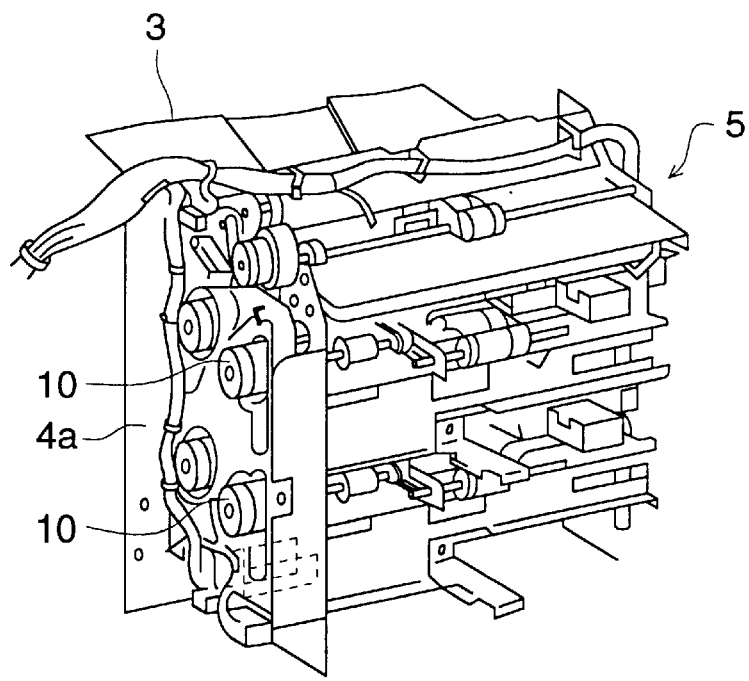

FIG. 2 is a perspective view showing the paper feeding-transporting unit 5 housed inside the upper paper feeding-transporting door 4a. The paper feeding-transporting unit 5 has the electromagnetic clutches 10. The electromagnetic clutches 10 to which driving force is transmitted from the motor (not shown in the drawing), the driving source, are brought into the transmitting state of driving force at a predetermined timing, cause the driving force transmitting medium (not shown in the drawing) including a gear to rotate the paper feeding rollers (not shown in the drawing), the driven members. By the rotation of the paper feeding rollers, the paper sheets in the trays 2a and 2b (FIG. 1) are fed and transported to make copying process. At this time, the operating noise of the paper feeding-transporting unit 5 is propagated to the outside through the paper feeding-transporting doors 4a and 4b, and further through the clearance between them.

Figure 3:
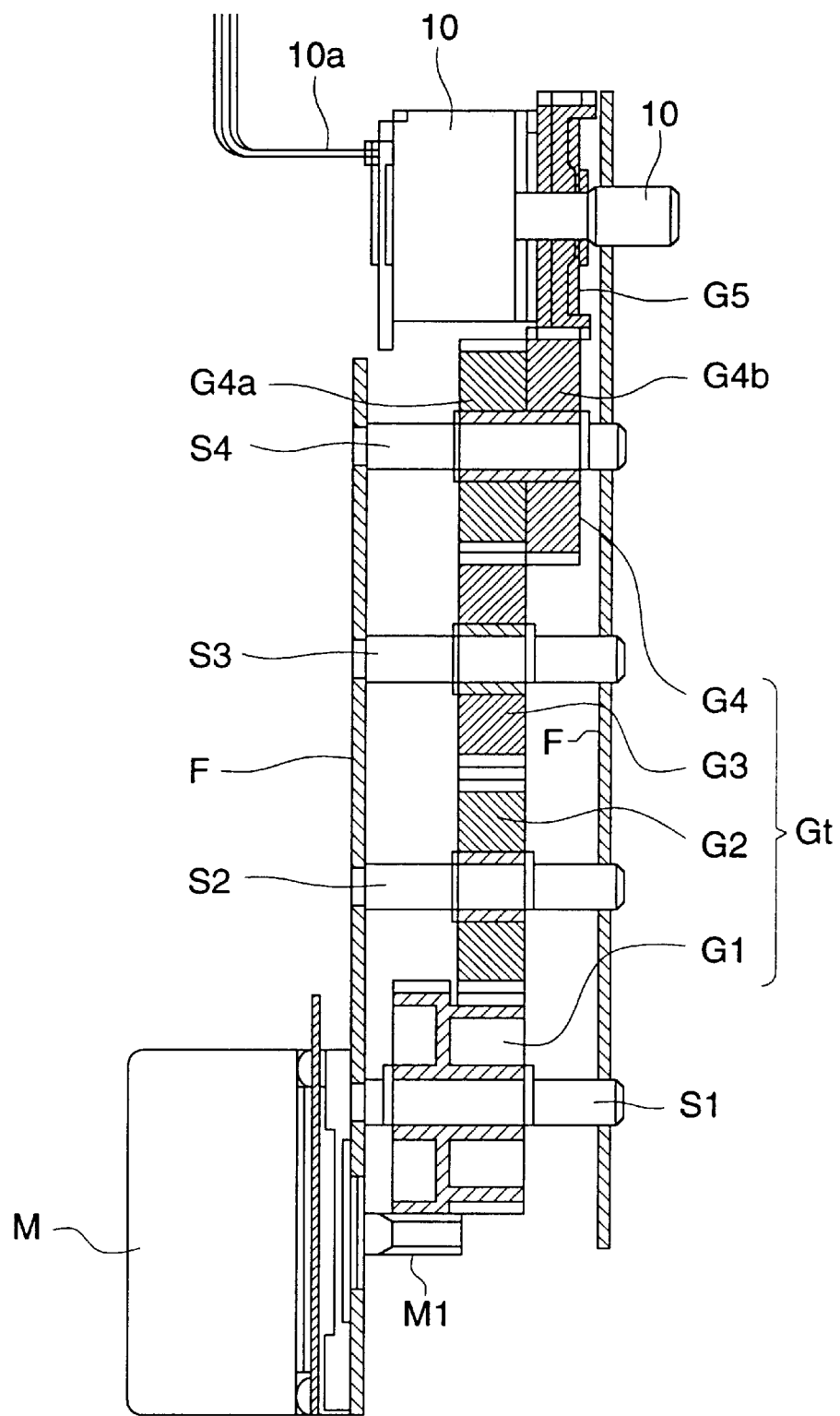
FIG. 3 is a drawing showing the driving force transmitting system from the motor in the paper feeding-transporting unit to the electromagnetic clutch.

FIG. 3 is a drawing showing the driving force transmitting system from the motor in the paper feeding-transporting unit 5 to the electromagnetic clutch. In FIG. 3, the motor M is fixed to the framework F. On the other hand, the gear train Gt composed of the gears G1, G2, G3, and G4, of which each sequentially engages with the former one, beginning with the motor shaft gear M1 of the motor M, are supported to be able to rotate by the framework F through the shafts S1, S2, S3, and S4. Further, the gear G4 is a combined gear made up of two gears joined together, the one of which G4a engages with the gear G3 and the other G4b engages with the gear G5, which are supported to he able to rotate disposed adjacent to the electromagnetic clutch 10.

The electromagnetic clutch 10 is coupled to the rotating shaft 11, and functions to rotate the gear G5 and the rotating shaft 11 as an integrally united member when it is brought into the transmitting state of driving force by the electric power supplied from a power source (not shown in the drawing) through the cord 10a. At the extending portion of the rotating shaft 11, the paper feeding rollers (not shown in the drawing) are fixed to feed the paper sheets from the trays 2a and 2b (FIG. 1) by the rotation of the rotating shaft 11.

Figure 4:
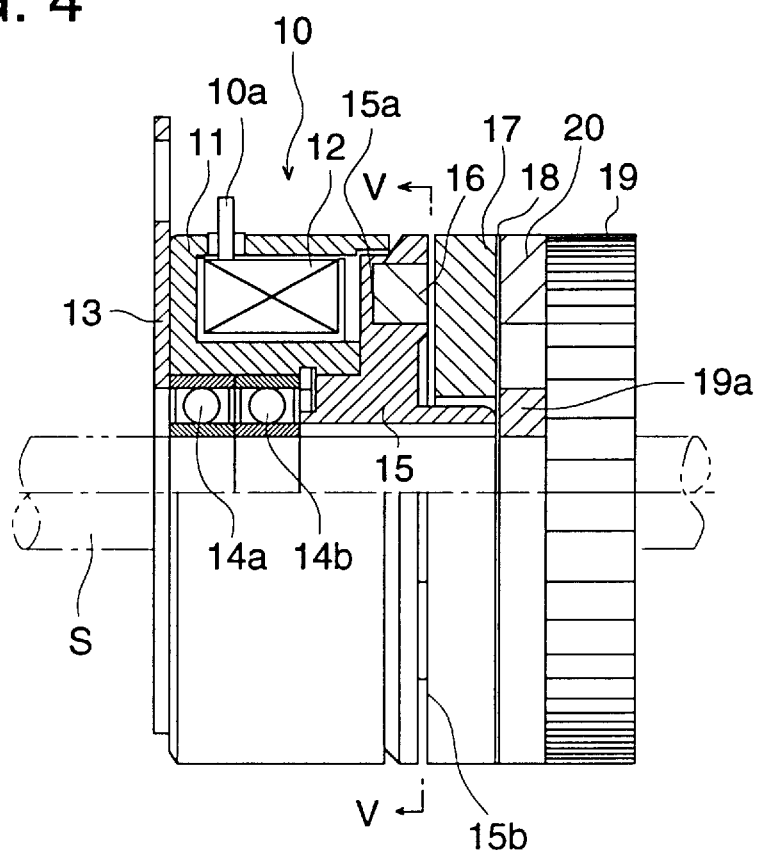
FIG. 4 is an enlarged partial cross-sectional view showing the electromagnetic clutch provided in the paper feeding-transporting unit 5 together with the gear.
Figure 5:
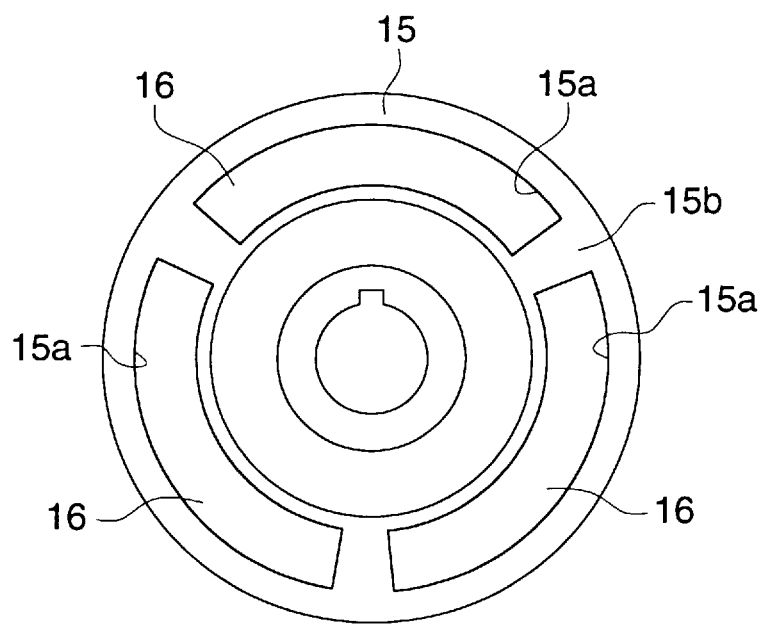
FIG. 5 is the cross-sectional view of the structure in FIG. 4 at the line V—V seen in the direction of the arrow marks.

First, regarding this embodiment of the invention the, following three cases are thinkable: the case where the viscoelastic member is provided at the rotor 15, the output portion, the case where it is provided at the gear 19, the input portion, and the case where it is provided at the rotor 15 and at the gear 19. The embodiment which will be described in the following with reference to FIG. 4 is an example in which the viscoelastic member is provided at the rotor 15 and at the gear 19. FIG. 4 is an enlarged partial cross-sectional view showing the electromagnetic clutch provided in the paper feeding-transporting unit 5 together with the gear. FIG. 5 is the cross-sectional view of the structure in FIG. 4 at the V—V line seen in the direction of the arrow marks. In FIG. 4, the electromagnetic clutch 10 is made up of the field core 11 having a shape of double cylinders with the coil 12 included in it. To the coil 12, it is connected the cord 10a to which electric power is supplied from a power source not shown in the drawing. On the other hand, in the left side of the field core 11, it is disposed the rotation stopper 13 which is integrally formed with it and fixed to the framework not shown in the drawing by screws to attain the rotation stopping of the electromagnetic clutch 10. Incidentally, the field core 11 and the coil 12 make up the displacing means.

The rotating shaft S (shown by a double dot and dash line) is supported to be able to rotate through the bearing 14a and 14b disposed inside the inner circumferential surface of the field core 11. Adjacent to the field core 11, there is provided the disk-shaped rotor 15 rotating with the rotating shaft S as an integrally united member. On the right side, in the drawing, 15b of the rotor 15, three concave portions 15a are formed.

As is clearly understood in FIG. 5, the concave portions 15a have a shape of a circular arc and disposed equidistantly in the direction of the circumference; in these concave portions are disposed the viscoelastic members 16, the shock easing member.

In FIG. 4, adjacent to the side surface 15b of the rotor 15, the short-cylinder-shaped armature 17 made of a magnetic material is formed. In the vicinity of the outer circumference of the right side surface of the armature 17, the portion in the vicinity of the outer circumference of the thin disk-shaped spring member 18 is fixed by screws (not shown in the drawing). The central portion of the spring member 17 on the opposite side to the armature 17 is fixed to the central convex portion 19a of the gear 19 by screws (not shown in the drawing) likewise. On the other hand, in the vicinity of the outer circumference of the gear on the side facing to the spring member 18, it is disposed the doughnut-shaped viscoelastic member 20, the shock easing member, compressed. The gear 19 is coupled to the motor M through the gear train Gt. In addition, the gear 19 makes up the input portion, and the rotor 15 makes up the output portion.

The viscoelastic members 16 and 20 is formed of a foamed EPDM, a thermoplastic elastomer, or a thermoplastic resin. Further, in some specification conditions of the electromagnetic clutch 10, heat generation may be accompanied, but in such cases, it is favorable to select a material that has a property with a low degree of variation with temperature rise, that is, with no reduction in shock easing effect.

In the following, the operation of this embodiment will be explained. In FIG. 4, suppose the gear 19 and the armature 17 are rotating in accordance with the driving force from the motor M (FIG. 3). When a sensor not shown in the drawing detects the timing to feed a paper sheet, the image forming member, electric power is supplied from the power source not shown in the drawing through the cord 10a to switch the electromagnetic clutch 10 to the transmitting state of driving force from the off state of driving force. In this case, the field core 11 generates an electromagnetic force due to the magnetic field produced in the coil 12 and attracts the armature 17 in a moment.

By the attracting of the armature 17, the rotor 15 and the armature 17 are made to rotate as an integrally united member due to the frictional force generated between them. Accordingly, the driving force from the gear 19 is transmitted to the rotating shaft S through the spring member 18, the armature 17, and the rotor 15. By the rotation of the rotating shaft S, paper feeding rollers (not shown in the drawing) rotate; thus paper feeding can be done.

When the electromagnetic clutch 10 is switched to the transmitting state of driving force from the off state of driving force, the armature 17 is accelerated by its electromagnetic force to collide with the side surface 15b of the rotor 15. In this case, the rotor 15 is exited to vibrate, but the viscoelastic member 16 has a function to damp the generated vibration effectively. Owing to that, the shock noise at the time of colliding of the armature 17 with the rotor 15 can be reduced. Further, the viscoelastic member 20 also damps the vibrations of the armature 17 and the rotor 15 effectively. It is because the viscoelastic member 20 is disposed compressed.

On the other hand, when the electromagnetic clutch is switched to the off state of driving force from the transmitting state of driving force, the armature 17 is retracted by the resilient force of the spring member 18. In this case, the armature 17 collides with the spring member or with the gear 19 through the spring member 18 to make the armature 17, the spring member 18, and the gear 19 exited to vibrate. However, the viscoelastic member 20 has a function to damp such a vibration effectively. Owing to that, the shock noise at the time of the collision of the armature 17, the spring member 18, and so forth can be reduced.

Figure 6:
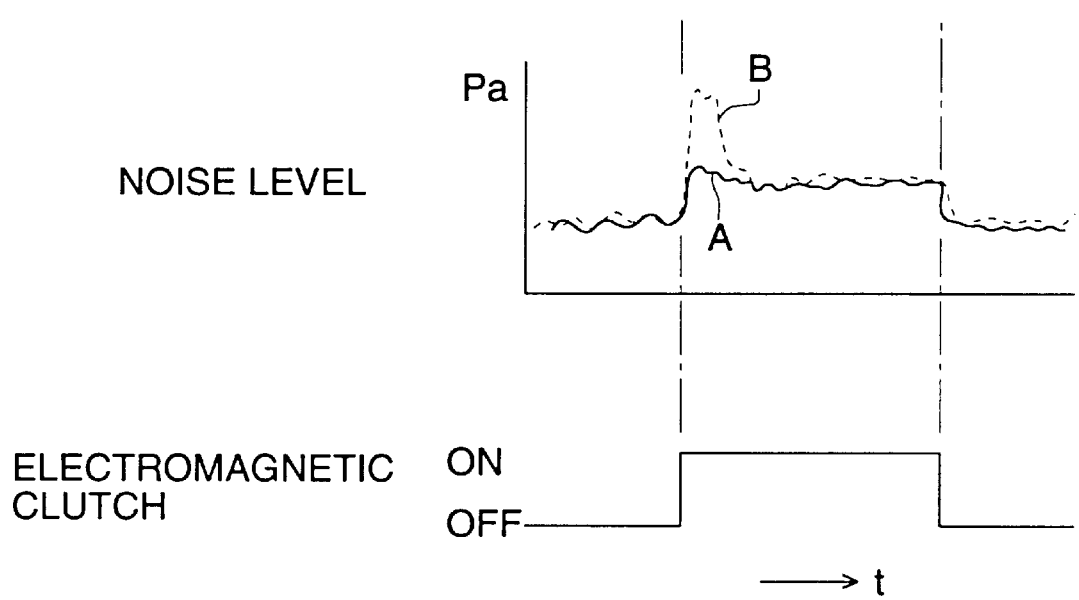
FIG. 6 is a graph showing the measured shock noise variations with time at the time of switching for the conventional electromagnetic clutch shown in FIGS. 18 and 19 and the electromagnetic clutch 10 provided with only the viscoelastic member 20 in comparison with each other; the curve A is for the one according to the embodiment of the invention and the curve B is for the one according to the conventional technology.
Figure 18:
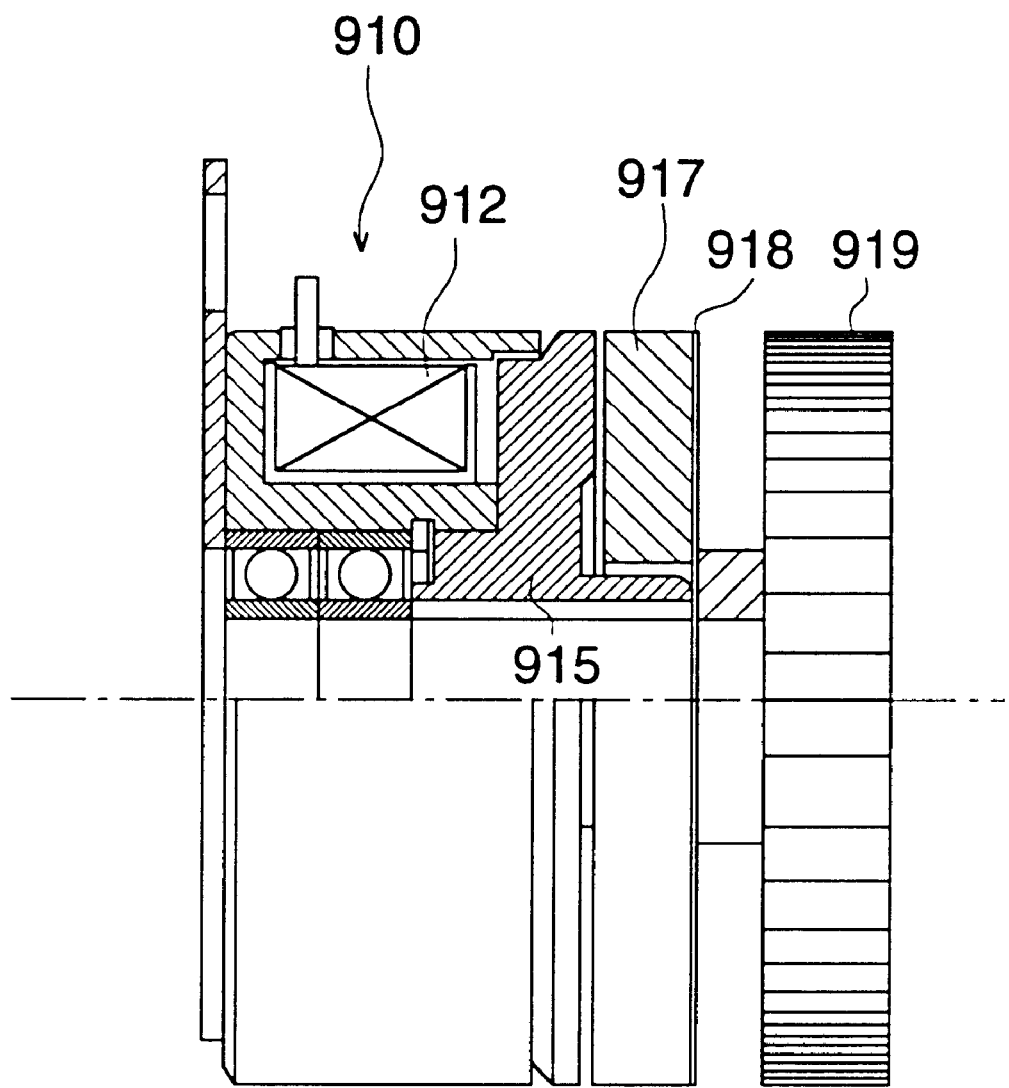
FIG. 18 is a partial cross-sectional view in the axial direction of the electromagnetic clutch 110 according to the conventional technology showing the electromagnetic clutch in the off state of driving force.
Figure 19:
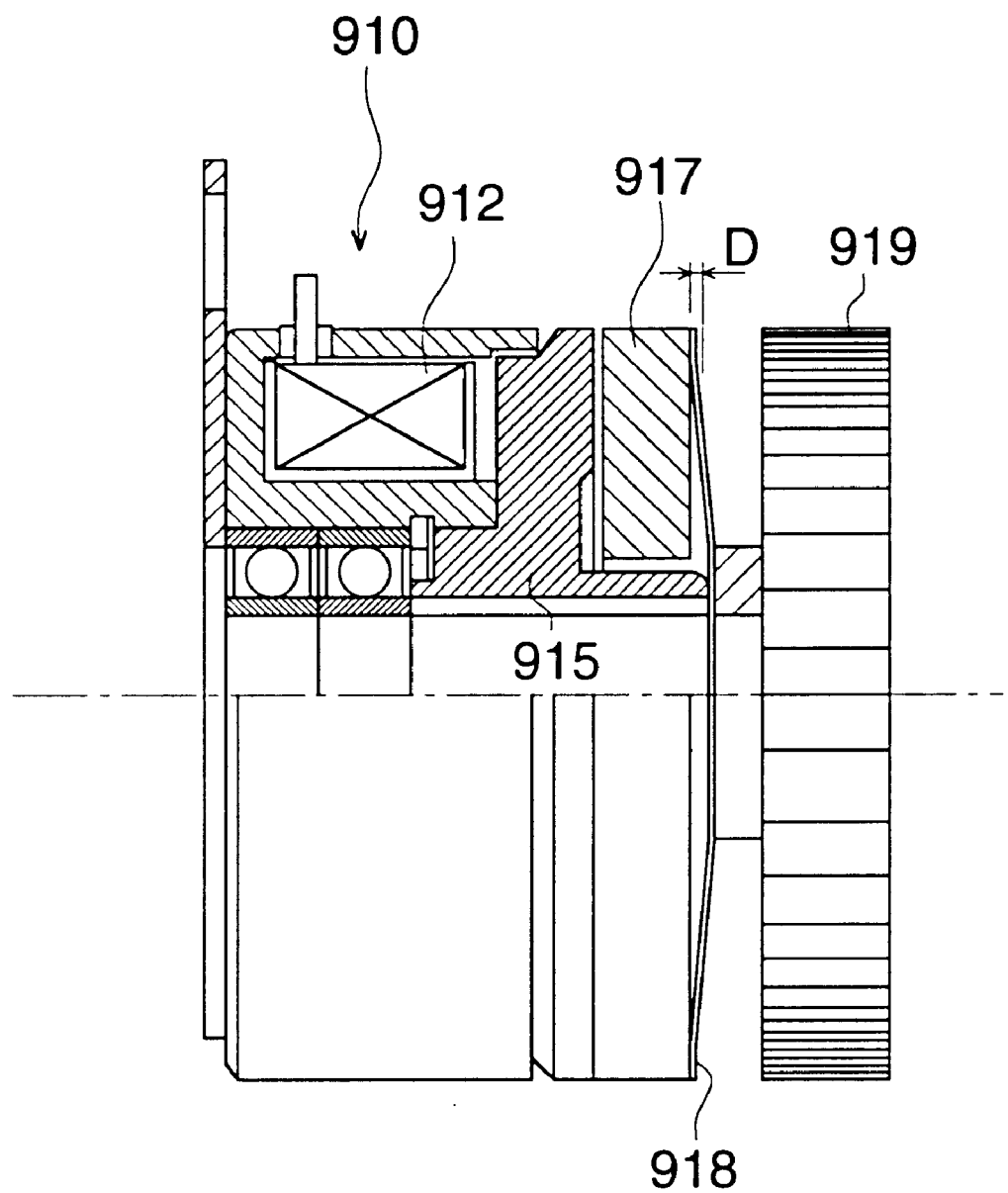
FIG. 19 a partial cross-sectional view in the axial direction of the electromagnetic clutch 110 according to the conventional technology showing the electromagnetic clutch in the transmitting state of driving force.

FIG. 6 is a graph showing the variation of the shock noises with time at the time of switching measured for the conventional electromagnetic clutch shown in FIGS. 18 and 19 and the electromagnetic clutch 10 provided with the viscoelastic member 20 only in comparison with each other; the curve A is for the one according to this embodiment, and the curve B is for the one according to the conventional technology.

According to the result of measurement shown in FIG. 6, by using the electromagnetic clutch according to this embodiment of the invention, the shock noise generated impulsively when the clutch is brought into the transmitting state of driving force can be remarkably reduced, and can be suppressed to approximately the same level as the noise in steady clutch operation.

Figure 7:
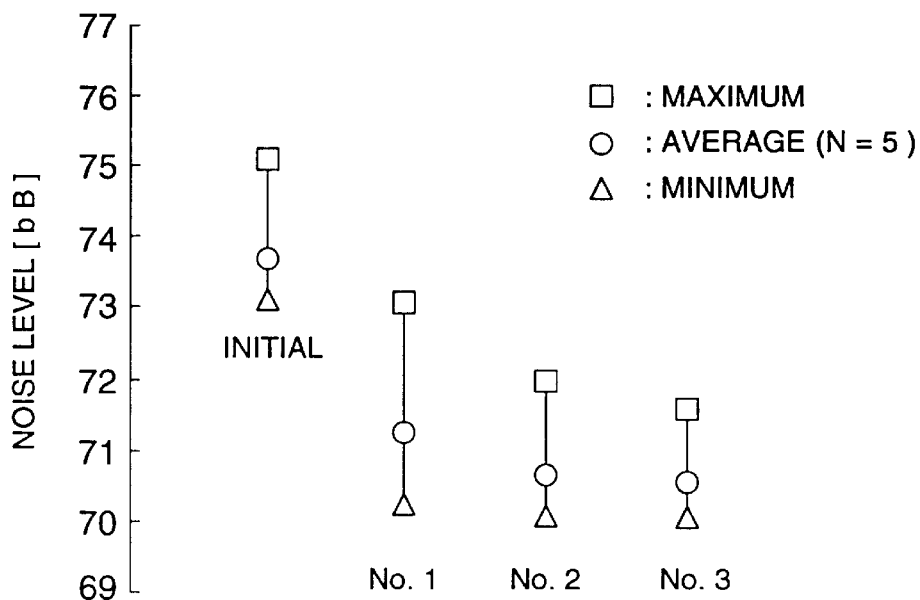
FIG. 7 is a drawing showing the test result of the shock noises at the time of switching the clutch for the electromagnetic clutch 10 provided with only the viscoelastic member 20 measured with the material of the viscoelastic member changed.

FIG. 7 is a drawing showing the test result of the shock noises at the time of switching of the electromagnetic clutch 10 provided with the viscoelastic member 20 only measured with the material of the viscoelastic member changed. First, the EPTOSEALER (a trade mark: manufactured by NITTO-DENKO Co. Ltd.) was used for the test sample No. 1, next, the E-4070 (a trade mark: manufactured by INOAC Corp.) was used for the test sample No. 2, and further, a polyurethane elastomer (rubber hardness (JISA hardness): 50, specific weight: 1.37, modulus of compression (under the condition of 10% compression): 0.25 kg/cm$^2$) was used for the test sample No. 3.

From the test result shown in FIG. 7, the effect to reduce the shock noise in this embodiment wherein the viscoelastic member 20 was used has been confirmed. Further, in the cases where the test samples No. 2 and No. 3 were used, it was found that the effect of reducing the shock noise was high, and the dispersion of the noise level was small.

According to this embodiment of the invention, the shock noise at the time of the operating of an electromagnetic clutch, which has been heretofore difficult to eliminate, can be eased, and can be reduced to such a low level as not to be recognized, even when compared with other noise levels. By using this embodiment, it is provided an image forming apparatus that can contribute to the establishment of the quiet and pleasant office environment.

Up to now, this invention has been explained with reference to the embodiment, however, this invention should not be interpreted as confined to the above-mentioned embodiment, and of course, it can be suitably altered and improved. For example, it may be appropriate to employ timing belts in place of a gear train for the driving system from the motor to the combined gear. Further, this invention is applicable to the electromagnetic clutches to be used in an ADU (Automatic Duplex Unit) or an ADF (Automatic Document Feeder). Moreover, the viscoelastic member may be provided at either of the rotor and the gear.

According to the clutch of this invention, when the displacing means displaces the one of the input portion and the output portion against the other, the shock easing member disposed at both or one of said input portion and said output portion damps the vibration of said input portion or said output portion effectively; hence, the shock noise can be reduced by it.

In the following, the second embodiment according to this invention will be explained.

Figure 8:
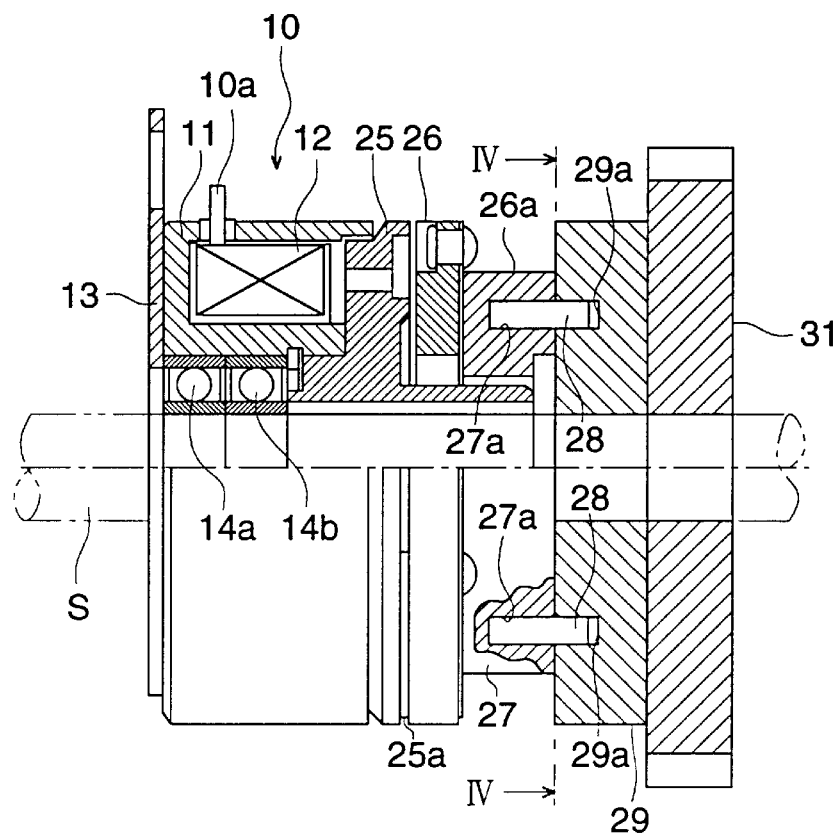
FIG. 8 is an enlarged partial cross-sectional view showing the electromagnetic clutch of the second embodiment provided in the paper feeding-transporting unit 5 together with the gear.

FIG. 8 is an enlarged partial cross-sectional view showing the electromagnetic clutch provided in the paper feeding-transporting unit 5 together with the gear. Figure is the cross-sectional view of the structure in FIG. 8 at the line IV—IV seen in the direction of the arrow marks. In FIG. 8, the electromagnetic clutch 10 is made up of the field core of double cylinder shape with the coil 12 included in it. To the coil 12, it is connected the coil 10a to which electric power is supplied from the power source not shown in the drawing. On the other hand, in the left side of the field core 11, it is disposed the rotation stopper 13 which is integrally formed with it and fixed to the framework not shown in the drawing by screws to attain the rotation stopping of the electromagnetic clutch 10. Incidentally, the field core 11 and the coil 12 make up the displacing means.

The rotating shaft S (shown by a double dot and dash line) is supported to be able to rotate through the bearings 14*a* and 14*b* disposed inside the inner circumferential surface of the field core 11. To the extending portion of the rotating shaft S, the paper feeding rollers not shown in the drawing are fixed. Adjacent to the field core 11, there is provided the disk-shaped rotor 25 rotating with the rotating shaft S as an integrally united member. Further, adjacent to the rotor 25, the circle-shaped armature 26 is disposed. On the right side, the side opposite the armature 26, the facing 25*a* like a thin plate having a high coefficient of friction is fixed.

Adjacent to the right side of the armature 26, the armature hub 27 having a shape of short cylinder is disposed. The armature hub 27 is linked to the armature 26 with the leaf spring 26*a*. The armature hub 27 has on its right side two closed holes 27*a* which extends parallel to the axial line formed at an interval of 180° in the direction of the circumference. In the closed holes 27*a*, the pins 28, the protruding portions, are inserted respectively. In addition, the armature 26 makes up the driving member coupling portion and the rotor 25 makes up the driven member coupling portion.

Opposite the pins 28, the disk-shaped opposing member 29 is disposed. As is clearly understood in FIG. 9, the opposing member 29 has the two elongated holes 29*a* formed on it corresponding to the pins 28. At the time of assembling, the pins 28 are disposed in a manner such that they are in contact with one end of the elongated holes 29*a*. Further, in the remaining space of the elongated holes 29*a*, the viscoelastic members (elastic members) 30 having a shape conforming with the shape of the space are disposed.

The viscoelastic members 30 have a rubber hardness of 20 to 60 (favorably 30 to 50) and are made of a silicone rubber, a silicone gel, or the like. As an example of such a viscoelastic material, for example, the ELASTAGE (registered trade mark) marketed by the TOSO Co. Ltd. is to be cited.

Adjacent to the opposing member 29, the gear 31 is disposed; the opposing member 29 and the gear 31 are joined by bolts not shown in the drawing to rotate as an integrally united body. The gear 31 is coupled to a motor not shown in the drawing through a gear train. That is, in this embodiment, it is to be understood that a gear train (not shown in the drawing) is disposed in the upstream side of the electromagnetic clutch 10.

In the following, the operation of this embodiment will be explained. In FIG. 8, it is to be understood that during the operation of the copying machine 1 (FIG. 1), the gear 31, the armature hub 27, and the armature 26 are rotating due to the driving force of a motor (not shown in the drawing) through a train of gears (not shown in the drawing). When a sensor (not shown in the drawing) detects the timing to feed a paper sheet, the electromagnetic clutch 10 is switched to the transmitting state of driving force from the off state of driving force due to electric power supplied from the power source not shown in the drawing through the cord 10*a*. In this case, an electric current flows in the coil, and the field core 11 and the rotor 25 are magnetized to attract the armature 26.

As mentioned above, when the armature 26 is attracted, the facing 25*a* is pressed between the rotor 25 and the armature 26, and due to the frictional force generated on the surfaces of the facing 25*a*, the rotor 25 and the armature 26 are brought into rotation together as an integrally united member. Accordingly, the driving force from the gear 31 is transmitted to the paper feeding rollers (not shown in the drawing) through the rotor 25 and the rotating shaft S; thus, by such rotation of the paper feeding rollers, paper sheets can be fed. Further, the leaf spring 26*a* functions in a manner such that the armature 26 should be separated from the rotor to secure a spacing of the order of 0.1 mm between them, when the rotor 25 is demagnetized due to the cutoff of the electric current to the coil 12 by the operation releasing signal to the electromagnetic clutch.

Now, while the electromagnetic clutch is in the off state of driving force, only a very week pressing force corresponding to the transmitted torque acts between the pins 28 and the viscoelastic members 30. In this case, when the electromagnetic clutch 10 is instantaneously switched to the transmitting state of driving force, a strong pressing force due to the large transmitted torque acts between the pins 28 and the viscoelastic members 30. Receiving a part of this force, the viscoelastic members 30 are deformed, while they transmit the rest of the force to the armature hub through the pins 28 at the same time. Accordingly, while the electromagnetic clutch is in the off state of driving force, the opposing member 29 and the armature hub 27 are rotating together as an integrally united member; however, after the time when the electromagnetic clutch is brought into the transmitting state of driving force, the pins 28, that is, the armature hub is delayed in rotating if observed in a minute time. In accordance with this, the rotor 25 and the rotating shaft S start rotating with a gradually increasing speed for a minute time; hence, the disordered behavior of each gear in the gear train and so forth provided in the upstream side of the electromagnetic clutch 10 can be prevented, and the shock noise can be reduced owing to it. On the other hand, also in the case of modified example wherein the gear train is provided in the downstream side of the electromagnetic clutch 10, because the rotor 25 starts rotating with a gradually increasing speed as mentioned above, the gears in said gear train are to be not sufficiently accelerated during the free running period of time. Hence, these gears collide with the tooth surfaces of the opposing gears with the speed kept low, resulting in low shock noise.

In addition, regarding the driving system including the electromagnetic clutch according to this embodiment, the measurement of the sound pressure at the position with a distance of 100 m from the back surface of the clutch gave the value of 77.8 dB. On the other hand, the result 82.3 dB was obtained for the case where the clutch was exchanged to the one without the viscoelastic member 30 and the same measurement was done. That is, the effect to reduce the noise according to this embodiment was 4.5 dB.

Further, in the situation that the electromagnetic clutch according to this embodiment is built into a normal copying machine, the measurement of the sound pressure at the outside of the copying machine gave the value of 69.1 dB. On the other hand, the same measurement with the clutch exchanged to the one having no viscoelastic member 30 gave the result of 73.6 dB. That is, the effect to reduce the noise in the situation where this embodiment was built into a copying machine was 4.5 dB.

According to this embodiment of the invention, the shock noise of the electromagnetic clutch which has heretofore been difficult to eliminate can be eased, and can be reduced to such a low level as not to be recognized even if it is compared with other noise levels. By using this embodiment, it is provided an image forming apparatus that can contribute to the establishment of the quiet and pleasant office environment.

Figure 10:
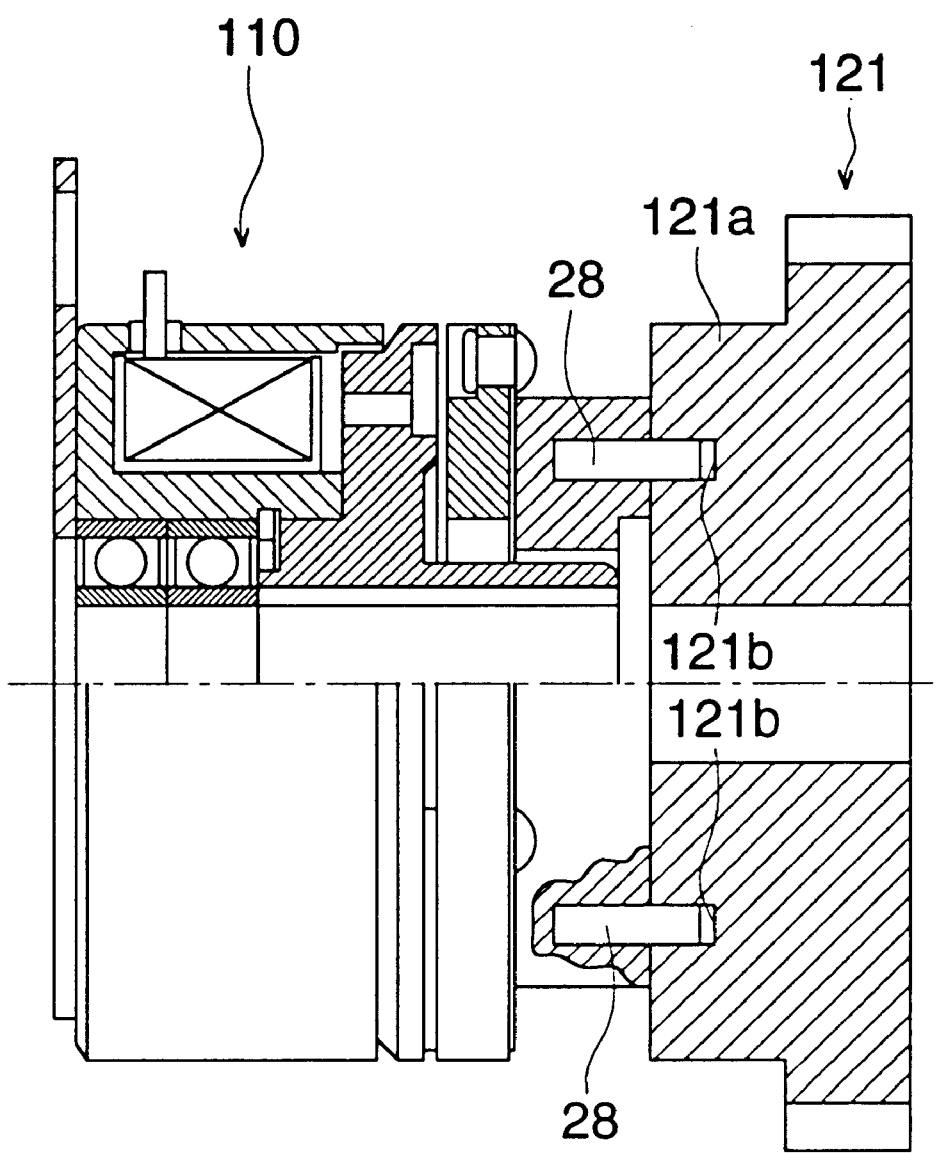
FIG. 10 is the cross-sectional view similar to FIG. 8 showing the electromagnetic clutch 120 according to the third embodiment together with the gear 121.

FIG. 10 is a cross-sectional view similar to FIG. 8 showing the electromagnetic clutch 120 according to the third embodiment of the invention and the gear 121. In addition, regarding the third embodiment, the explanation will be concentrated only to the points that are different to the embodiment shown in FIG. 8 and the detailed explanation for the parts that are common to both will be omitted.

It is the shape of the gear 121 that the point in the third embodiment shown in FIG. 10 which is substantially different from that in the second embodiment. That is, as shown in FIG. 10, the gear has a structure such that the opposing member 29 and the gear 31 shown in FIG. 8 are joined together. To state it more concretely, the gear 121 has a disk portion 121a formed at the position of the opposing member 29. In the disk portion 121a, the same elongated holes 121b and viscoelastic members (not shown in the drawing) as those shown in FIG. 8 are provided. Therefore, according to the third embodiment also, the same effect as the second embodiment can be obtained.

Figure 11:
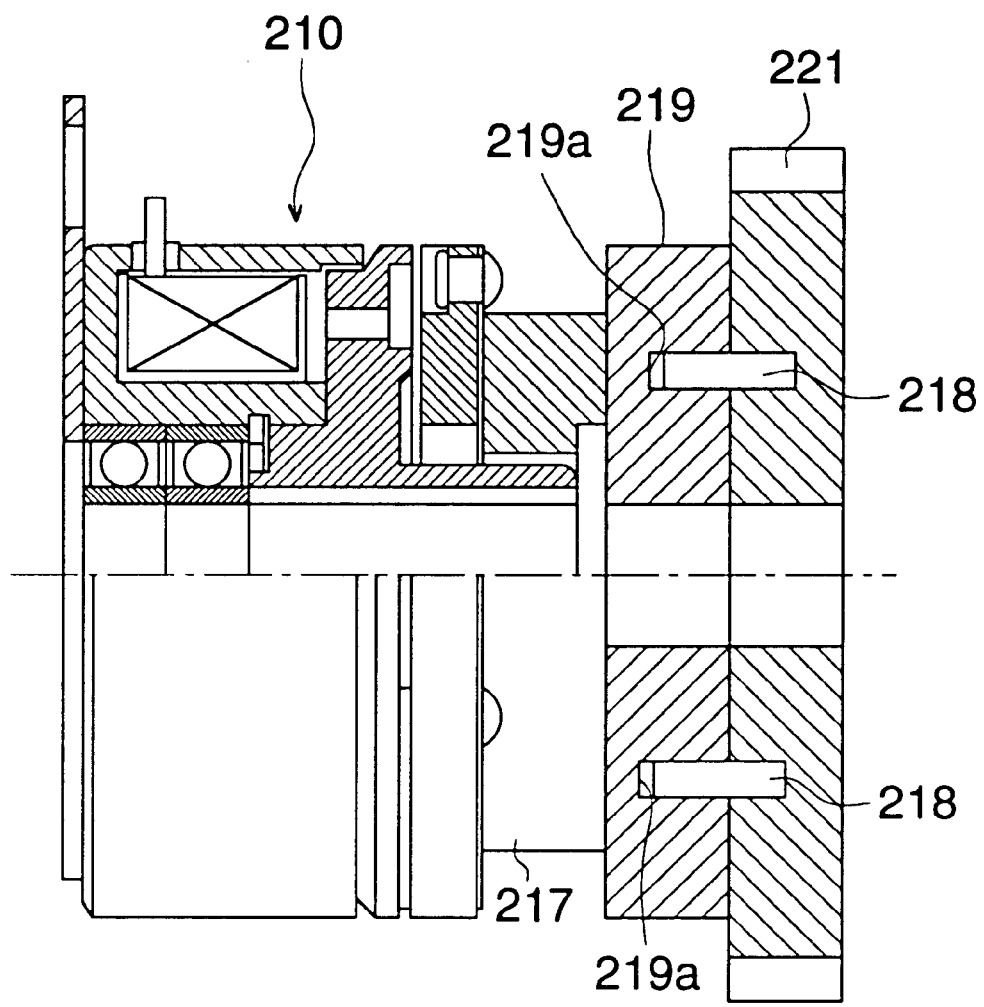
FIG. 11 is the cross-sectional view similar to FIG. 8 showing the electromagnetic clutch 220 according to the fourth embodiment together with the gear 221.

FIG. 11 is a cross-sectional view similar to FIG. 8 showing the electromagnetic clutch 220 and the gear 221 according to the fourth embodiment. In addition, regarding the fourth embodiment too, the explanation will be concentrated only to the points that are different from those in the embodiment shown in FIG. 8, and the detailed explanation concerning the parts that are common to both will be omitted.

Figure 9:
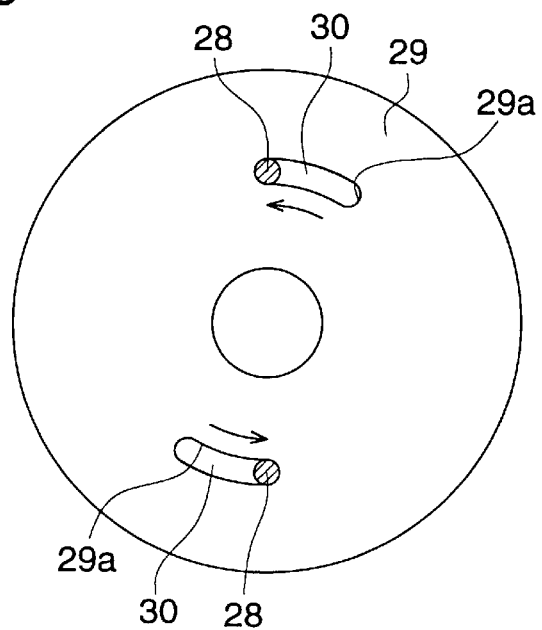
FIG. 9 is the cross-sectional view of the structure in FIG. 8 at the IV—IV line seen in the direction of the arrow marks.

The point in the fourth embodiment shown in FIG. 11 that is substantially different from the second embodiment is that the opposing member 219 is made to rotate together with the armature hub 217 as an integrally united member, and the pins 218 are provided in the gear 221 by being inserted into it. In the opposing member 219, the same elongated holes and the viscoelastic members (not shown in the drawing) as those shown in FIG. 9 are provided. Therefore, according to the fourth embodiment too, the same effect as the second embodiment can be obtained.

Figure 12:
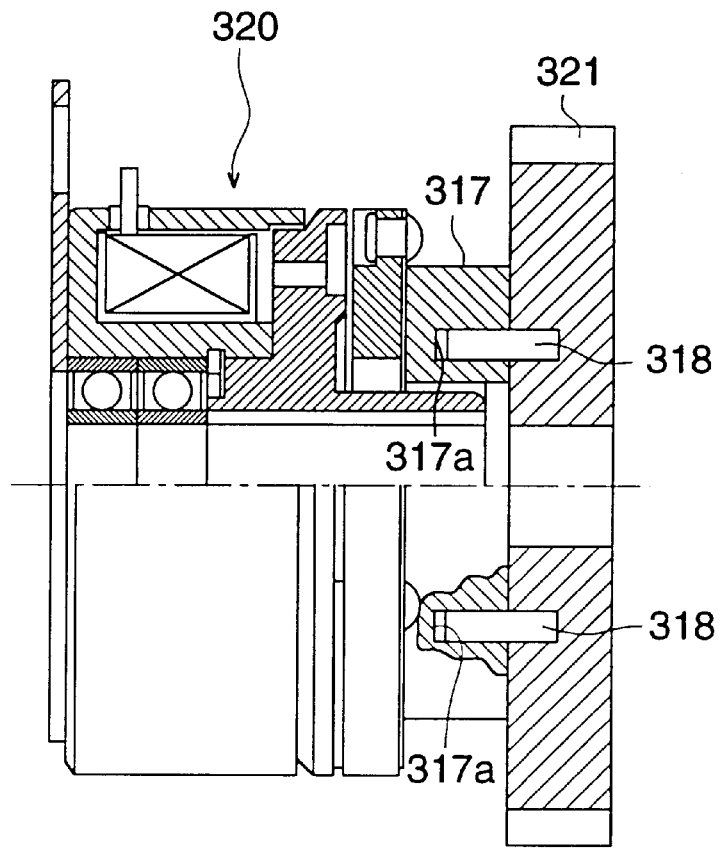
FIG. 12 is the cross-sectional view similar to FIG. 8 showing the electromagnetic clutch 320 according to the fifth embodiment together with the gear 321.

FIG. 12 is a cross-sectional view similar to FIG. 8 showing the electromagnetic clutch 320 and the gear 321 according to the fifth embodiment of the invention. In addition, regarding the fifth embodiment too, the explanation will be concentrated only to the points that are different from those in the embodiment shown in FIG. 8, and the detailed explanation concerning the parts that are common to both will be omitted.

The point in the fifth embodiment shown in FIG. 12 hat is substantially different from the second embodiment is that the opposing member 219 is omitted and the elongated holes 317a are formed in the armature hub 317, and the pins 318 are provided in the gear 321 by being inserted into it. According to the fifth embodiment, the effect that the number of parts can be reduced is also obtained in addition to the effect obtained by the second embodiment.

Figure 13:
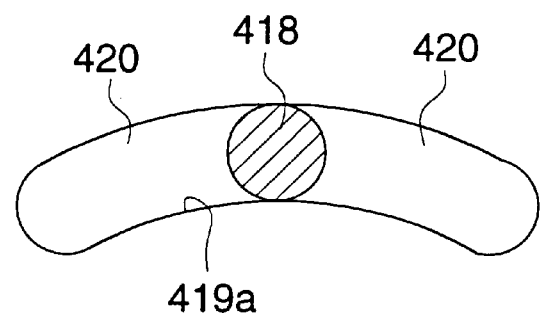
FIG. 13 a drawing showing a modified example of the relationship of the pin to the elongated hole.

FIG. 13 is a drawing showing the relationship of the pins to the elongated holes in a modified example. In the embodiment shown in FIG. 9, the pins are disposed, with respect to the elongated holes, at the positions being in contact with one end of them respectively. In contrast to this, in the modified example shown in FIG. 13, the pin 418 is disposed at the center of each of the elongated holes 419a, and a pair of viscoelastic members 420 each having the same shape as the other are disposed at the left and right sides of said pin 418. According to this modified example, the effect to reduce the shock noise is obtained owing to the function of the viscoelastic members, even in the case where the gear rotates in either of both directions to transmit driving forth.

Up to now, the second through fifth embodiments of this invention have been explained. However, this invention should not be interpreted within the confines of the above-mentioned embodiments, and of course, it can be suitably altered and improved. For example, the gear adjacent to the clutch for driving the gear train may be substituted by a pulley for driving a timing belt. Further, this invention is not limited to an electromagnetic clutch, but can be applied to a mechanical clutch.

According to the clutch of this invention, the noise reducing means is composed of a protruding portion disposed at one of the driving source and the driving source coupling portion, and an elastic member disposed at the other so that driving force may be transmitted between said elastic member and said protruding portion when said driving source coupling portion and the driven member coupling portion engage with each other, and said elastic member eases the shock force transmitted from said protruding portion; hence, for example, when the clutch is brought into the transmitting state of driving force, the shock force given by the colliding of said protruding portion with said elastic member is eased and the shock noise is to be eased by it.

According to the noise reducing structure of this invention, the structure is composed of a protruding portion disposed at one of the driving source and the driven member, and an elastic member disposed at the other of said driving source and said driven member so that driving force may be transmitted between said elastic member and said protruding member, and said elastic member eases the shock force transmitted from said protruding portion; hence, in the transmitting medium for driving force provided with this noise reducing structure, even if a sudden rise of load or the like occurs to cause said protruding portion to collide with said elastic member, the shock force given at that time is eased and the shock noise is to be eased by it.

Figure 14:
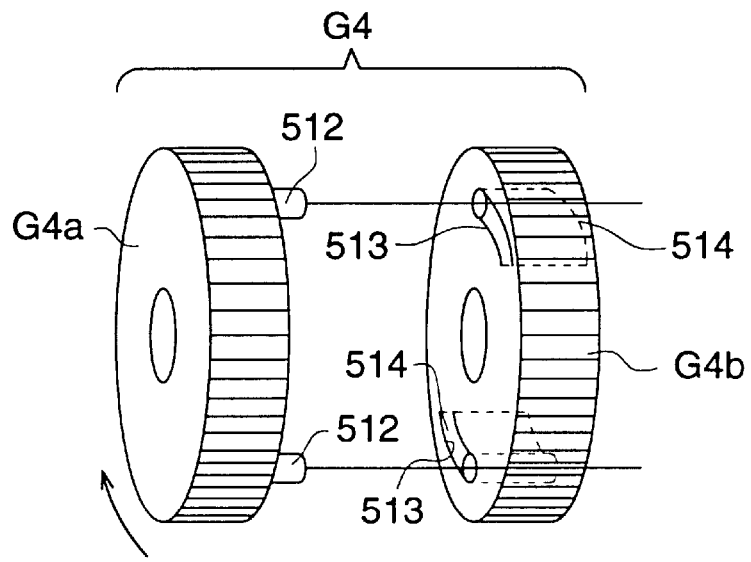
FIG. 14 is an exploded perspective view showing the combined gear G4 according to the sixth embodiment.
Figure 15:
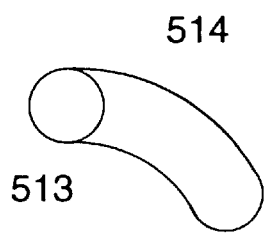
FIG. 15 is the front view of one of the elongated holes 513 and viscoelastic members 514.

In the following, it will be explained as the sixth embodiment of the invention an example wherein the noise reducing means is applied to the combined gear. FIG. 14 is an exploded perspective view showing the combined gear G4. In FIG. 14, the gear G4a, a driving gear, in the left side has two pins arranged in the direction parallel to the axial line inserted into it. On the other hand, the gear G4b, a driven gear, in the right side has elongated holes 513 formed at the positions opposite the pins 512 respectively. At the time of assembling of the combined gear G4, the pins 512 are disposed in such a manner as to be in contact with one end of the elongated holes 513. In the remaining space of each of the elongated holes 513, the viscoelastic member 514 having a shape conforming to that of the space is to be disposed. FIG. 15 is the front view of one of the elongated holes and viscoelastic members 514. Incidentally, the pins 512 make up the protruding portions and the viscoelastic members 514 make up the elastic members or the viscoelastic members.

The viscoelastic members 640 have a rubber hardness of 20 to 60 (favorably 30 to 50) and are made of a silicone rubber, a silicone gel, or the like. As an example of such a viscoelastic material, for example, the ELASTAGE (registered trade mark) marketed by the TOSO Co. Ltd. is to be cited.

In the following, the operation of this embodiment will be explained. In FIG. 3, the motor M is rotating but little load is given to the gear train Gt, because the electromagnetic clutch is in the off state of driving force. Now, when a sensor not shown in the drawing detects the timing to feed a paper sheet, electric power is supplied from the power source not shown in the drawing through the cord 10a, and the electromagnetic clutch 10 is switched to the transmitting state of driving force from the off state of driving force. In this case, the driving force of the motor M is instantaneously transmitted to the paper feeding rollers (not shown in the drawing), so that a paper may be fed at a suitable timing.

Now in FIG. 14, the pins 512 of the gear G4a rotate in the direction of the arrow mark in the drawing by receiving a driving force from the motor M, but when the load from the paper feeding rollers is given to the gear G4b, the viscoelastic member 514 is given an impulsive force in the direction of rotation. Receiving a part of this force, the viscoelastic members 514 are deformed to transmit the rest of force to the gear G4b through the elongated holes 513 at the same time. Accordingly, after the electromagnetic clutch 10 is brought into the transmitting state of driving force, the transmission of driving force between the gears G4a and G4b is done in such a manner as to increase gradually if observed in a minute time. That is, by using the viscoelastic members 514, the collision between the tooth surfaces of the gears in the gear train Gt is eased and the useless vibration is suppressed, so that the shock noise can be suppressed to a low level.

Further, regarding the copying machine with the driving system having the combined gear according to this embodiment built into it, the measurement of sound pressure in accordance with DIN EN27779 gave the value of 71.2 dB. On the other hand, by the likewise measurement with the clutch exchanged to the one that does not use the viscoelastic members 514, the result 68.6 dB was obtained. That is, the effect of reducing the noise in the state where this embodiment is built into a copying machine was 2.6 dB.

According to this embodiment, the shock noise of the electromagnetic clutch which has heretofore been difficult to eliminate can be eased, and can be reduced to such a low level as not to be recognized even if it is compared with other noise levels. By using this embodiment, it is provided an image forming apparatus which can contribute to the establishment of the quiet and pleasant office environment.

Figure 16:
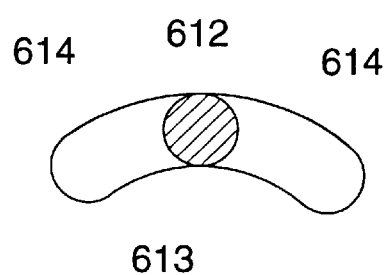
FIG. 16 is a drawing showing the relationship of the pin to the elongated hole in a modified example.

FIG. 16 is a drawing showing the relationship of the pin to the elongated hole in a modified example. In the embodiment of FIG. 14, the pins are disposed at the positions being in contact with one end of them respectively. In contrast to this, in the modified example shown in FIG. 16, the pin 612 is disposed at the center of the elongated hole 613, and the pair of viscoelastic members 614 each having the same shape as the other are disposed opposing to each other in the left and right side of the pin 612. According to this modified example, the effect to reduce the shock noise is obtained owing to the function of the viscoelastic members, even in the case where the gear G4a (refer to FIG. 14) rotates in either of both directions to transmit driving forth.

Figure 17:
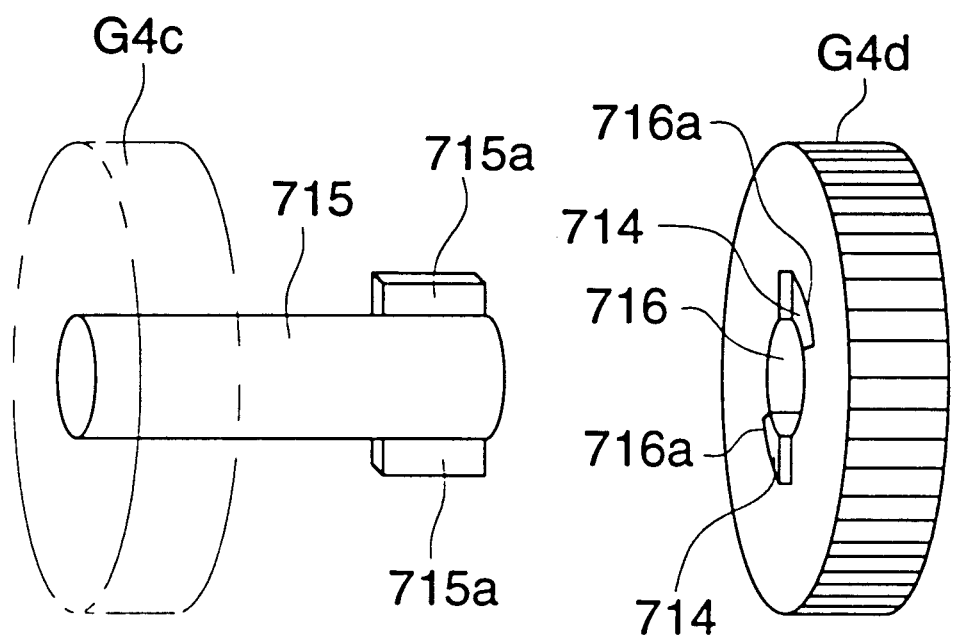
FIG. 17 is the perspective view similar to FIG. 14 showing the relationship of the rotating shaft to the gear according to the seventh embodiment.

FIG. 17 is a perspective view similar to FIG. 14 showing the relationship of the rotating shaft to the gear according to the seventh embodiment. In addition, regarding the seventh embodiment, the explanation will be concentrated only to the points that are different to the embodiment shown in FIG. 14 and the detailed explanation for the parts that are common to both will be omitted.

The point in the seventh embodiment shown in FIG. 17 that is substantially different from the sixth embodiment is that the protruding portions making up a part of the noise reducing means are not provided in one gear making up the combined gear but are provided in the rotating shaft. To state it more concretely, the rotating shaft 715 fixed to the gear G4c shown by the double dot and dash lines at its one end has the rectangular-plate-shaped protruding portions 215a projecting in the opposite radial directions formed integrally at the other end. On the other hand, the gear g4d has two notch portions 216a opposing to each other formed at parts of the circumference of the central hole 216 engaging with the rotating shaft 215. In each of the notch portions 216a, the viscoelastic member 214 is disposed.

As the embodiments described in the foregoing, receiving a part of the driving force transmitted impulsively, the viscoelastic members 714 in this embodiment also are deformed, while they transmit the remaining force to the gear G4d through the notch portions 716a at the same time. That is, by using the viscoelastic members 714, the collision between the tooth surfaces of the gears in the gear train is eased and the useless vibration is suppressed, so that the shock noise can be suppressed to a low level.

In the above, this invention have been explained with reference to the embodiments, however, this invention should not be interpreted as confined to the above-described embodiments, but of course, it can be suitably altered and improved. For example, in the driving system from the motor to the combined gear, a timing belt may be used in place of the gear train.

According to the noise reducing structure of this invention, the noise reducing means is provided between the driving source and the switching mechanism, and by using an elastic member or a viscoelastic member that is deformed by receiving the driving force, said means is made up in such a manner as to gradually increase the transmission of the driving force, when said switching mechanism carries out the connection of the driving force; hence, the collision between the transmitting elements in the transmitting mechanism can be eased, and the shock noise is reduced by it, if for example, it is compared with the case where the driving force is instantaneously transmitted.

What is claimed is:

1. A clutch, comprising:
    an input section for providing a driving force,
    an output section for outputting the driving force,
    shifting means for shifting in a shifting direction, one of the input section and the output section against the other one of the input section and output section, between an engaging position where the driving force is transmitted by the engagement of the input section with the output section and a releasing position where the driving force is intercepted by releasing one of the input section and output section from the other of the input section and output section, and
    a shock easing member proximate the input section and deformable in a shifting direction for reducing shock caused by the shifting when one of the input section and the output section is shifted against the other one of the input section and output section.

2. The clutch of claim 1, wherein the shifting means comprises a spring to return the one of the input section and the output section from the engaging position to the releasing position, and the shock easing member is arranged to contact the spring when the one of the input section and output section is returned to the releasing position.

3. The clutch of claim 1, wherein the other one has an engaging surface to engage with the one, a concave is provided on the engaging surface, and the shock easing member is provided in the concave.

4. The clutch of claim 1, wherein the shifting means comprises an electromagnetic member to cause an electromagnetic force with which the one of the input section and the output section is shifted against the other one of the input section and output section.

5. The clutch of claim 1, wherein the input section is one of a gear and a timing belt pulley.

6. The clutch of claim 1, wherein the shock easing member is at least one of a foamed EPDM, a thermoplastic elastomer, and a thermoplastic resin.

7. The clutch of claim 1, wherein the output section is coupled with a sheet conveyance device of an image forming apparatus.

8. The clutch of claim 1, wherein the input section comprises a shiftable part shiftable to the engaging position by the shifting means and a non-shiftable part, and the shock easing member is disposed between the shiftable part and the non-shiftable part, and wherein the shock easing member is expanded when the shiftable part is shifted to the engaging position and compressed when the shiftable part is returned to the releasing position.

9. The clutch of claim 8, wherein the shock easing member is doughnut shaped.

10. The clutch of claim 9, wherein the output section has an engaging surface perpendicular to the shifting direction and the concave portion is disposed on the engaging surface.

11. The clutch of claim 9, wherein the engaging surface has a disk-like shape and the concave portion has an arc-like shape.

12. The clutch of claim 1 further comprising:
a noise reducing member proximate at least one of the input section and the output section.

13. A clutch, comprising:
an input section for inputting a driving force,
an output section for outputting the driving force,
shifting means for shifting one of the input section and the output section against the other one of the input section and output section between an engaging position where the driving force is transmitted by the engagement of the input section with the output section and a releasing position where the driving force is intercepted by releasing one of the input section and output section from the other of the input section and output section;
a shock easing member provided to at least one of the input section and the output section, for reducing shock caused by the shifting; and
a noise reducing member proximate at least one of the input section and the output section and comprising:
first and second coupling surfaces disposed so as to face each other, one of the first and second coupling surfaces having a concave section,
an elastic member disposed in the concave section, and
a protrusion provided to the other one of the first and second coupling surfaces, inserted in the concave section and contacting the elastic member,
wherein when the driving force is transmitted by the engagement of the input section with the output section at the engaging position, the driving force is transmitted through the contact between the protrusion and the elastic member.

14. The clutch of claim 13, wherein the elastic member is a viscoelastic member.

15. The clutch of claim 13, wherein the output section is coupled to a sheet conveyance device of an image forming apparatus.

16. A clutch, comprising:
an input section for providing a driving force,
an output section for outputting driving force, the output section having a concave portion,
shifting means for shifting in a shifting direction one of the input section and the output section against the other one of the input section and output section between an engaging position where the driving force is transmitted by the engagement of the input section with the output section and a releasing position where the driving force is intercepted by releasing one of the input section and output section from the other, and
a shock easing member disposed in the concave portion of the output section so as to be deformable in the concave portion so that shock caused by the shifting is restrained from being transmitted to the shifting direction and a direction perpendicular to the shifting direction.

\* \* \* \* \*